United States Patent Office 3,533,195
Patented Oct. 13, 1970

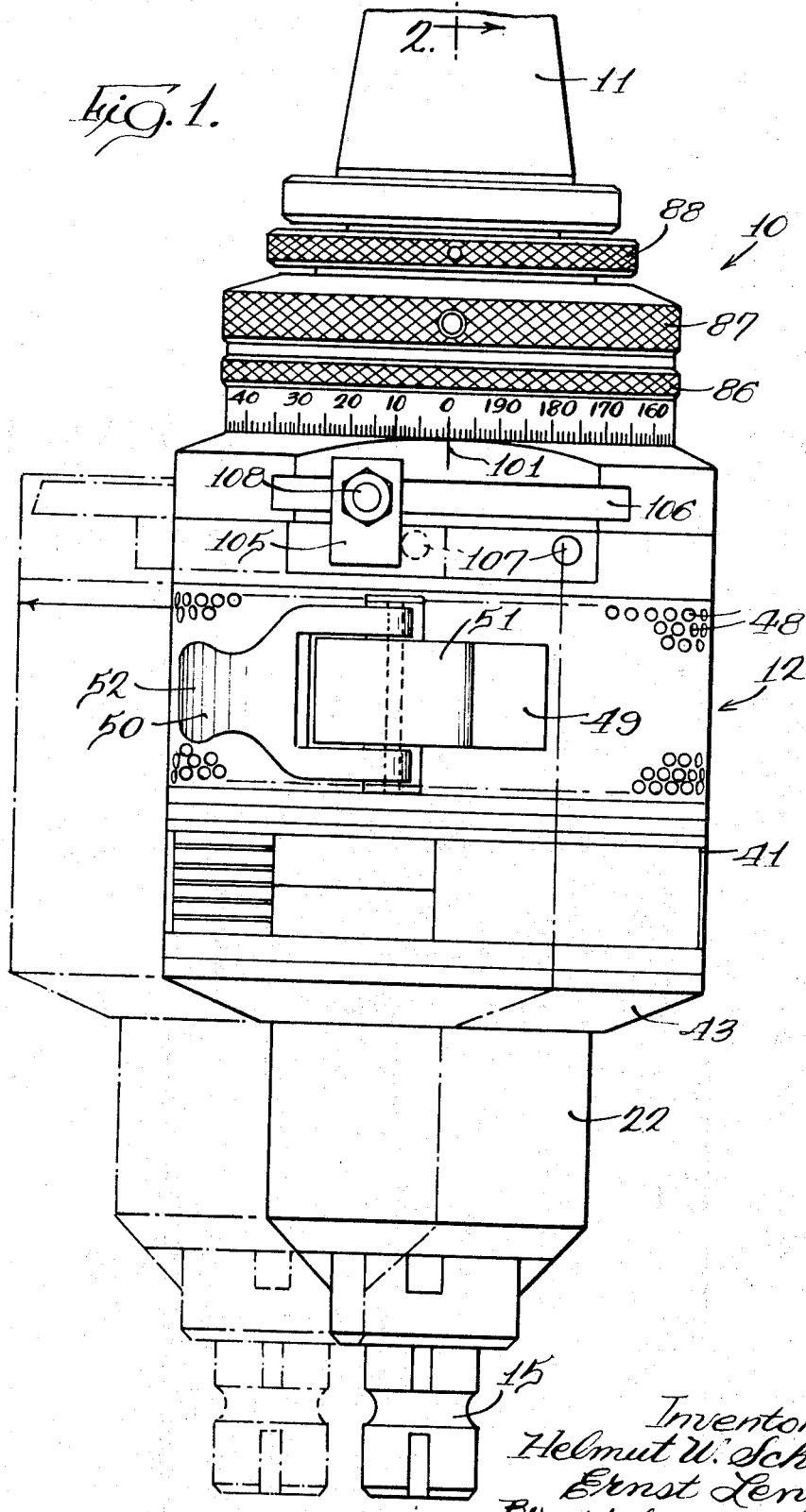

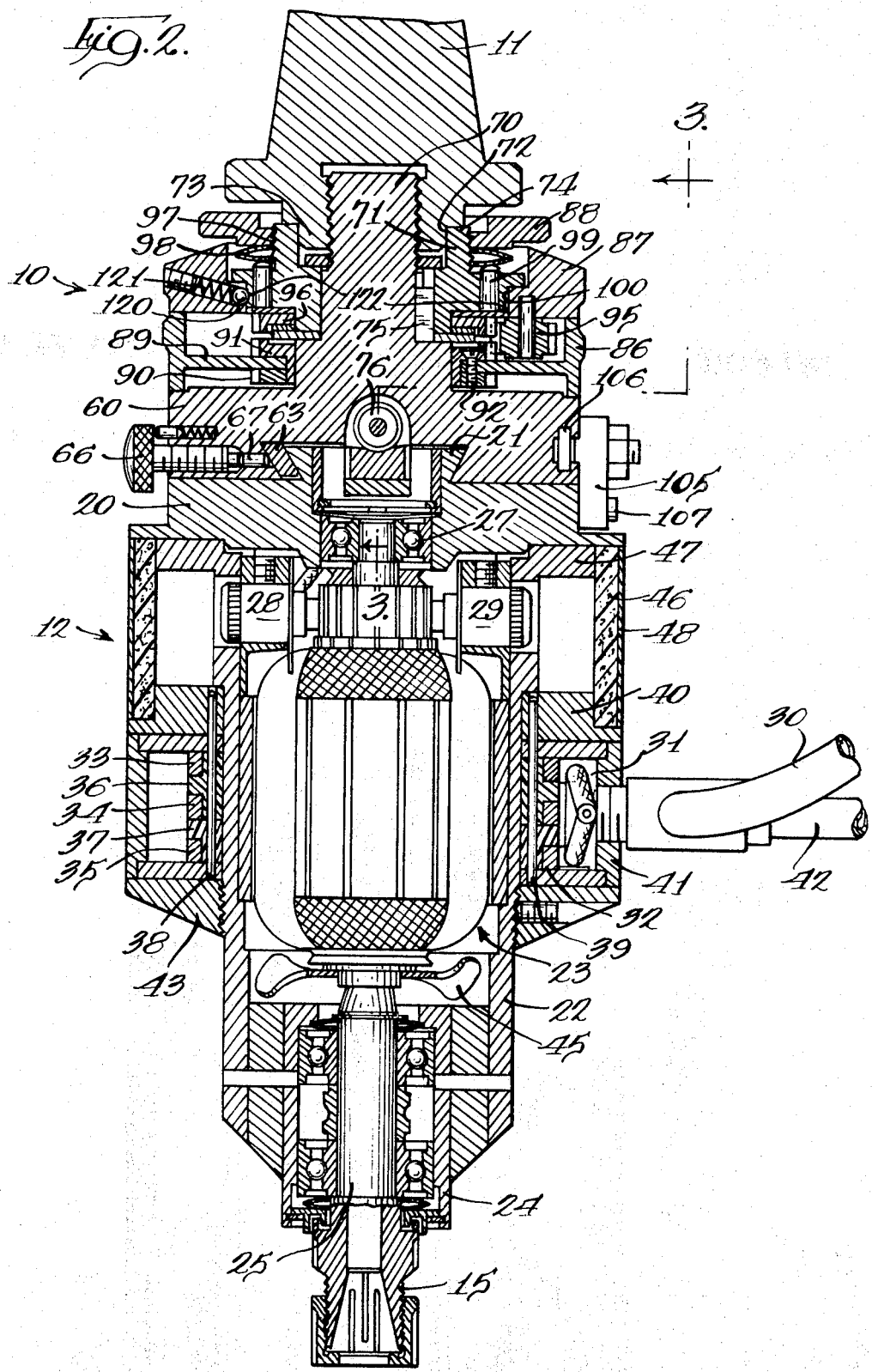

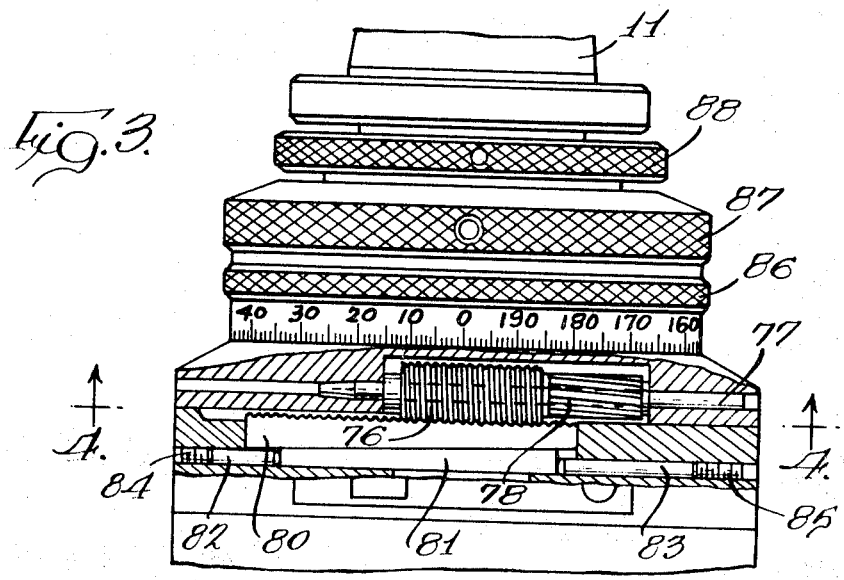
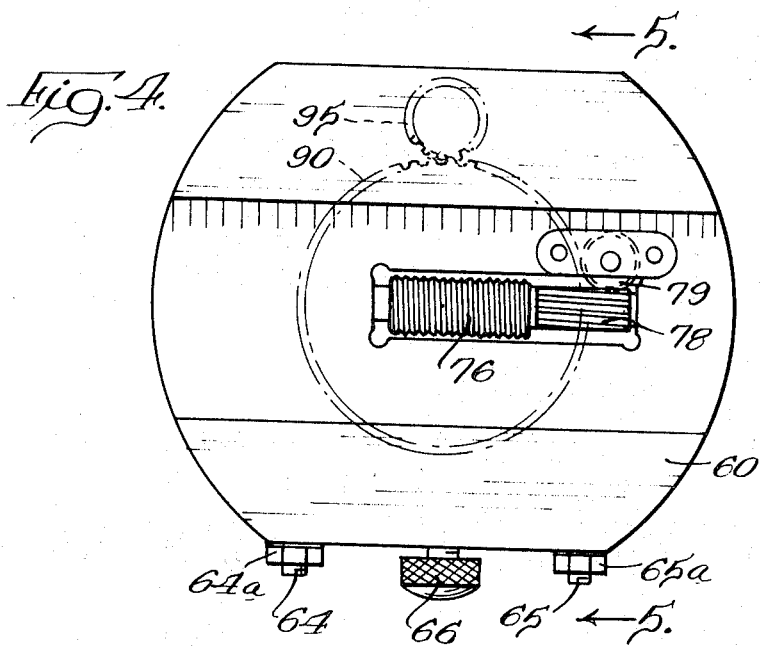
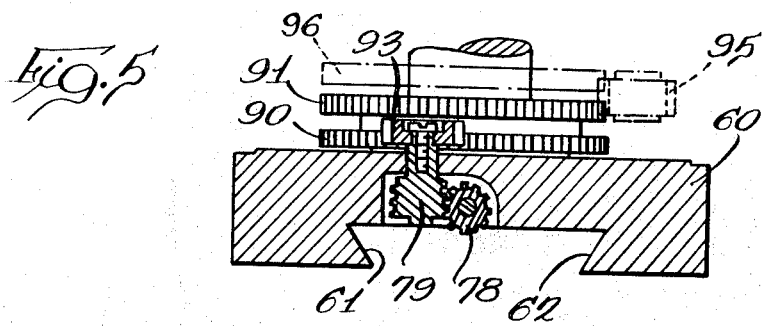

3,533,195
JIG GRINDER HEAD
Helmut W. Schumann, Leichlingen, and Ernst Lenz, Dillkreis, Germany, assignors, by direct and mesne assignments, to Rockwell Manufacturing Company, a corporation of Pennsylvania
Filed Apr. 22, 1968, Ser. No. 722,983
Int. Cl. B24b 41/04, 5/06; B23q 3/12
U.S. Cl. 51—245       15 Claims

ABSTRACT OF THE DISCLOSURE

A jig grinder head having a feed head mountable in the spindle of a machine tool and a tool head movable on the feed head for radial feed movement with coarse and fine feed rings mounted on the feed head and connected through gearing to cause adjustment of the tool head upon relative movement of one of the feed rings relative to the body of the feed head. The coarse feed ring is provided with calibrations to give a visual indication of the feed adjustment and the fine feed ring operates through motion of the coarse feed ring to result in the coarse feed ring also giving an indication of the fine feed adjustment.

BACKGROUND OF THE INVENTION

This invention relates to a jig grinder head or the like wherein a high speed machine element such as a rotating grinding wheel can be given a planetary motion to provide for grinding or milling of a workpiece surface.

A prior known construction is of the type shown in Szafran Pat. No. 3,035,376 in which a jig grinder attachment has provision for both coarse and fine feed adjustments but which has many shortcomings in operation and utilization. In the unit of the prior patent (which is owned by the assignee of this application), it was not possible to utilize rotation of the unit by a machine tool spindle to obtain both coarse and fine feed adjustments and further both hands were required in certain of the operations. Additionally, if set for automatic adjustment and then manual adjustment was attempted, there could be breakage of certain parts of the relatively complex mechanism.

SUMMARY

An object of this invention is to provide a new and improved jig grinder head wherein coarse and fine adjustment of the radial feed can be obtained through control of one or the other of a pair of concentric rings either of which may be manually grasped as the jig grinder head is rotated by the spindle of a machine tool to provide the adjustment.

Still another object of the invention is to provide a jig grinder head as defined in the preceding paragraph wherein the adjustments are provided by means of gearing operated by the coarse and fine feed rings including a planetary differential drive gear rendered effective by tightening of a clutch mechanism when the fine feed adjustment is to be made. The coarse feed ring has calibrations thereon which can be read to give an indication of both coarse and fine feed adjustments since the coarse feed ring is caused to move during a fine feed adjustment.

A further object of the invention is to provide an adjustable preset stop mechanism for the jig grinder head defined in the preceding paragraphs which can be set to limit the outward extent of the radial feed movement with engagement of the stop mechanism resulting in stopping of the feed without harmful effects on the adjusting mechanism because of slippage in the clutch mechanism. Additionally, means are provided to give an audible signal for at least each revolution of adjustment of the fine feed ring relative to the remainder of the jig grinder head.

Additional features of the invention are to provide a mounting of the tool head for radial movement relative to the feed head of the jig grinder head through a dovetail slide with a gib tightening mechanism to eliminate all clearance in the dovetail slide to provide for ultra precision finish grinding and spark out; for simple take-up adjustment on the lead screw nut relative to the lead screw which causes movement of one head relative to the other; for interchangeability of mounting arbors on the feed head of the jig grinder head by providing a threaded stem surrounded by a cylindrical well which receives a telescopic part of the arbor which is threaded on the stem to provide rigid accurate mounting; a new and improved collector ring assembly for the supply of power to the motor for driving the quill of the jig grinder head; and a new and improved air cooling system for the jig grinder head.

Further objects and advantages will become apparent from the following detailed description taken in connection with the accompanying drawings.

BRIEF DESCRIPTION OF THE DRAWING

FIG. 1 is an elevational view of the jig grinder head with a mounting arbor shown at the upper end partially broken away and with the tool head shown in broken line in a position of maximum radial feedout position relative to the setting of an adjustable stop;

FIG. 2 is a vertical section taken generally along the line 2—2 in FIG. 1;

FIG. 3 is a vertical partial section taken generally along the line 3—3 in FIG. 2;

FIG. 4 is a section taken generally along the line 4—4 in FIG. 3; and

FIG. 5 is a section taken generally along the line 5—5 in FIG. 4 and with the tool head omitted.

DESCRIPTION OF THE PREFERRED EMBODIMENT

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The jig grinder head is shown generally in FIG. 1 and has a feed head indicated generally at 10 with a mounting arbor 11 extending upwardly from the upper end thereof for mounting in the spindle of a machine tool. A tool head indicated generally at 12 is radially adjustably mounted on the feed head 10 and has a quill rotatably mounted therein having a collet mechanism 15 at the lower end thereof.

The jig grinder head can be attached to jig bores, milling machines and other standard and non-standard machine tools with the tool head 12 housing a strong electric motor and a very accurate and very rigid quill for carrying a machining element for grinding or milling a work surface. The tool head 12 can be adjusted radially of the axis of rotation of the jig grinder head as supported in the machine tool spindle to displace laterally the quill axis and provide a planetary movement for the machining element as derived from rotation of the machine tool spindle. A position of lateral adjustment is shown in broken line in FIG. 1.

Referring first to the tool head 12 shown in FIGS. 1 and 2, a base member 20 has a hardened dovetail slide 21 extending along the upper surfaces thereof for mounting the tool head to the feed head 10. A housing 22 is connected to and depends from the base member 20 and has a central bore receiving the armature and field assemblies of an electric motor for driving a quill 25, as indicated generally at 23, and for receiving a ball bearing package 24 which rotatably mounts the quill 25 having the collet 15 at the lower end thereof. An additional ball bearing 27 is fitted in the base member 20 to rotatably guide the motor shaft at the end opposite the quill. A pair of brush holders 28 and 29 are fitted through openings in the housing 22 and are connected to an external power line 30 through a ring system including an outer stationary ring assembly 31 and an inner ring assembly 32. The outer stationary ring assembly includes three stationary brushes which engage three collector rings 33, 34 and 35. The collector rings 33 and 34 are mounted on an insulating member 36 having a spacer rib between the rings while the ring 35 is mounted on an insulating member 37. The inner collector ring assembly is held in assembled relation by a pair of pins 38 and 39 extending therethrough with the pins extending into a partition ring 40 fastened to the housing 22. The outer stationary ring assembly is connected to an annular member 41 which does not rotate because of its connection to the power cord 30 and a rod 42 extends out from the member 41 to engage against a support surface to hold the member 41 against rotation. The ring assemblies are held in position by a ring nut 43 threaded to an external thread on the housing 22.

Air is circulated through the interior chamber of the housing 22 by a fan 45 on the motor shaft which draws air through a filter element 46 surrounding an air inlet defined by a space between a flange 47 at an upper end of the housing 22 and the partition ring 40. This filter element is held in place by a discontinuous screen member 48 which is perforate to let air pass therethrough and which has adjacent ends held together by a cam lock. The cam lock has a catch member 49 at one end of the screen 48 and an over-center latch member 50 having a latch element 51 on the other end of the screen engageable with the catch 49 and a handle 52 movable to an overcenter position to hold the latch element 51 and catch 49 in locked position.

The tool head 12 as described is a self-sustained machining unit wherein a high speed motor is supplied with power for rotation thereof to drive a quill which carries a machining element for rotation. The bodily movement of the tool head is derived from the mounting thereof to the feed head 10 to be described.

The feed head has a body 60 provided with a dovetail recess having downwardly inclined surfaces 61 and 62 shaped correspondingly to the dovetail slide 21 of the tool head with the surface 62 engaging one side of the dovetail slide and the surface 61 having a gib 63 associated therewith which engages the opposite surface of the dovetail slide 21. A pair of adjusting screws 64 and 65 engage the gib 63 to provide an adjustment thereof with holding of the adjusted position by the lock nuts 64a and 65a. In order to apply additional drag temporarily, the gib 63 can be pressed more firmly against the dovetail slide 21 by a knurled screw 66 threaded into the body part 60 and operating against a pin 67 engageable against the backside of the gib 63. Tightening of this screw does not completely lock the slide, but it gives additional rigidity to the slide mechanism during ultra precision finish grinding and spark out which is the final step in completion of the job.

Rotation of the feed head 10 and resultingly of the tool head 12 is derived from the machine tool spindle which receives the arbor 11. The arbor 11 is threaded onto a threaded upwardly extending stem 70 at the upper end of the body part 60 with a collar 71 accurately fitted on the portion of the stem 70 beneath the threads thereon, having a cylindrical surface 72 spaced from and surrounding the threaded portion of the stem to define a guide well which telescopically receives a flange 73 at the lower end of the arbor. These engaging surfaces coacting with the interengaging flat surfaces between the collar 71 and adapter 11 as indicated at 74 provide for concentricity of the arbor relative to the jig grinder head. The collar 74 is keyed to the body part 60 by a key 75.

Movement of the tool head 12 radially with respect to the axis of rotation of the arbor 11 is derived from rotation of a lead screw 76 rotatably mounted on a rod 77 fitted in the feed head body. The lead screw is integral with a helical gear 78 which is driven by gear means including a pinion 79. The lead screw 76 engages a lead screw nut 80 mounted at the top of the base member 20 of the tool head 12 to convert rotation of the lead screw into linear movement of the tool head. In order to provide for wear takeup the lower sutface of the lead screw nut 80 is an inclined plane and is engageable by a wedge block 81 which can be laterally adjusted, as shown in FIG. 3, by shifting of pins 82 and 83 in a channel by rotation of threaded members 84 and 85 threaded into threaded portions of this channel. The threaded members can be suitably engaged by tools extended into the ends of the channel.

Movement of the lead screw and resulting movement of the tool head 12 can be accomplished either by coarse or fine feed adjustment involving the utilization of a series of concentric rings rotatably mounted on the body 60 of the feed head. These rings include a coarse feed ring 86, a fine feed ring 87, and a clutch ring 88, all of which have at least a portion of their outer periphery knurled to facilitate manual engagement therewith.

The coarse feed ring 86 has a transverse internal flange 89 to which a pair of annular externally toothed gear members 90 and 91 are attached by means of connecting screws 92. The teeth of gear 90 mesh with a gear 93 of the gear means which rotates the lead screw 76 as shown in FIG. 5. With the jig grinder head being rotated by the mounting of the arbor 11 in the machine tool spindle, it is possible to obtain a coarse adjustment of radial feed by manually engaging the coarse feed ring 86 which stops the gear 90 while the body 60 of the feed head continues to rotate along with the tool head 12 carried thereby. This carries the gear 93 along the gear 90 to cause rotation of the gear means including gear 79 which causes rotation of the gear 78 resulting in rotation of the lead screw 76. This coarse feed adjustment is carried out with the clutch ring 88 being inactive and can be in either direction dependent upon the direction of machine tool spindle rotation.

The fine feed adjustment involves the use of both the fine feed ring 87 and the clutch ring 88. The fine feed ring rotatably carries a planetary gear 95 having teeth of sufficient height as shown in FIG. 2 to engage the external teeth of the gear 91 and to also engage the external teeth of an annular gear 96 which is floatingly mounted on the adapted guide collar 71 of the feed head 60. When a coarse feed adjustment is being made, the gear 96 is free to rotate relative to the feed head so that the planetary gear 95 has no effect on the system. When a fine feed adjustment is to be made, the gear 96 is made operative. This is accomplished by threading the clutch ring 88 downwardly on the adapter guide collar 71 by a threaded engagement therebetween as indicated at 97 to compress springs 98 which engage against a series of pins 99 engageable against a clutch disc 100 which engages the upper face of the gear 96. When the clutch ring 88 is tightened and resultingly moved downward, as viewed in FIG. 2, clutch disc 100 is pressed tightly against the gear 96 to frictionally lock the gear to the body 60 of the feed head. As a result, with the system rotating as derived from the machine tool spindle, manual engagement of the fine feed ring 87 will hold the planetary gear 95 fixed in space so that rotation of gear 96 will cause rotation of the planetary gear 95 which will be transmitted through gear 91 to gear 90 and then to the gear means shown in FIG. 5 which drives the lead screw 76. This provides a planetary differential drive gear mechanism to obtain radial fine feed motion.

The coarse feed ring 86 is calibrated as shown in FIGS. 1 and 3 to provide an indication of adjustment relative to a reference mark 101 (FIG. 1) on the body 60 of the feed head. Since the fine feed adjustment also results in a rotation of the coarse feed ring 86, the same calibrations also provide an indication of fine feed adjustment.

The gear relations are designed with the calibrations to provide an accurate indication of adjustment of radial feedout for each revolution of the jig grinder head imparted by the machine tool spindle. As an example, although not being limited thereto, the coarse feed ring calibration is divided into 200 divisions with each division equaling .0001 inch of radius, or .0002 inch of diameter, with one entire revolution of the coarse feed ring resulting in a .040 inch adjustment on diameter. The fine feed ring provides an adjustment of .0005 inch on diameter for one revolution of the fine feed ring 87 relative to the jig grinder head.

An adjustable stop mechanism is provided which limits the radial feedout position of the tool head 12 and which can be used to insure repeat accuracy. This adjustable stop mechanism includes a stop member 105 adjustable along a groove 106 in the body 60 of the feed head and a pin 107 extending outwardly from the base member 20 of the tool head 12. With the parts set in one position of adjustment, and with stop member 105 held in position by a screw 108, the limit position of the tool head is shown in broken line in FIG. 1. This preset stop can function because there is no positive drive causing the engagement between the stop surfaces. If the fine feed ring 87 is being held when the stops come into abutment, this will only result in a slippage of the gear 96 so that only frictional forces need to be overcome if there is a continuing force acting to urge the standard tool head 12 outwardly.

With the structure disclosed herein, it is possible to obtain coarse and fine feed adjustments continuously while the jig grinder head is rotating by merely holding the desired feed ring with the fine feed requiring the tightening of the clutch ring 88 in advance thereof. An operator need only use a single hand to engage either of the rings 86 or 87 while the mechanism is operating, and a direct reading of either coarse or fine feed adjustment can be obtained from the calibrated scale on the coarse feed ring 86 coacting with the mark 101. In addition to the visual indication provided by the calibrations on the coarse feed ring 86, an audible indication of every half revolution of the fine feed ring 87 relative to the remainder of the structure is provided by a ball 120 carried by the fine feed ring and urged by a spring 121 toward a pair of oppositely positioned detents 122 in the outer surface of the arbor locating collar 71. With the fine feed ring 87 manually held stationary, the guide collar 71 rotates relative thereto and at each half revolution there will be an audible click from engagement of the ball 120 with a detent on the collar to give the audible indication of the adjustment in radial position.

We claim:

1. A jig grinder head having a feed head for mounting in a spindle of a suitable machine tool and a tool head carrying a driven quill movably mounted on said feed head whereby rotation of said machine tool spindle rotates the jig grinder head and the quill additionally rotates a machining element, means for adjusting said tool head relative to said feed head in a direction radially of said jig grinder head rotation including a lead screw on said feed head and a lead screw nut on said tool head, a pair of independently and selectively manually engageable concentric feed rings movably mounted on the feed head providing fine and coarse adjustments for said tool head relative to said feed head, and a gear train effective upon stopping either of said rings while the jig grinder head is bodily rotated to cause rotation of said lead screw at a rate dependent upon which ring is moved relative to the jig grinder head.

2. A jig grinder head as defined in claim 1 wherein said gear train includes a differential gear drive to cause movement of said coarse feed ring relative to the feed head at a slower rate when the fine feed ring is manually engaged than when the coarse feed ring is directly engaged.

3. A jig grinder head as defined in claim 2 wherein said coarse feed ring is calibrated relative to a reference mark on said feed head to provide a direct reading of both coarse and fine adjustments.

4. A jig grinder head as defined in claim 1 with means to provide an audible signal for at least each revolution of the feed head relative to the fine feed ring.

5. A jig grinder head as defined in claim 1 wherein said lead screw nut is tapered with an inclined plane surface on the underside thereof, a wedge block movably mounted in said tool head and engageable with said surface, and means for holding said wedge block in longitudinally adjusted position to control the engagement of said lead screw nut with the lead screw and enable takeup for wear.

6. A jig grinder head as defined in claim 1 wherein a dovetail slide movably mounts the tool head on the feed head with an adjustable gib on said tool head, and means for forcing said gib against the mating slide surface to eliminate all clearance and apply additional drag for additional rigidity during finish grinding and spark out.

7. A jig grinder head as defined in claim 1 wherein the jig grinder head quill is driven by an electric motor, power supply means for said motor including a ring system carrying an outer stationary ring assembly and an inner collector ring assembly with said inner ring assembly including a pair of insulating collars having conductive ring elements thereon, and pin means connecting said collars together and to a rotatable body part of the tool head.

8. A jig grinder head as defined in claim 1 wherein the quill is driven by an electric motor, and an air cooling system for the motor including a blower, an air inlet, an air filter element in said inlet including a discontinuous annular perforate screen, and a cam lock for holding the adjacent ends of the screen together.

9. A jig grinder head having a feed head for mounting in a spindle of a suitable machine tool and a tool head carrying a quill movably mounted on said tool head whereby rotation of said machine tool spindle rotates the jig grinder head and the quill additionally rotates about its own axis, a dovetail slide connecting said feed and tool heads for movement one relative to the other, a lead screw and a lead screw nut carried one on each of said feed and tool heads for causing movement of one of the last-mentioned heads relative to the other, a pair of independently and selectively engageable concentric feed rings for providing coarse and fine adjustment for said tool head in a direction radially of said jig grinder head rotation, each of said rings being rotatably mounted on the body part of said feed head, gear means engageable with said lead screw whereby rotation of said gear means causes rotation of said lead screw, a first gear on said coarse feed ring engageable with the gear means whereby rotation of said body part relative to the coarse feed ring causes rotation of said gear means to coarsely adjust the tool head, and differential gearing operable by the fine feed ring to cause rotation of the coarse feed ring relative to said body part when the fine feed ring moves relative to said body part.

10. A jig grinder head as defined in claim 9 wherein said fine and coarse feed rings are superimposed, a second gear fixed to said first gear, a third gear loosely mounted on said body part, a planetary gear carried by the fine feed ring, and clutch means for clutching said third gear to said body part whereby movement of the fine feed ring relative to the body part holds the planetary gear fixed in space and rotation of the third gear causes rotation of the first and second gears relative to said body part to rotate the lead screw.

11. A jig grinder head as defined in claim 10 wherein adjustable coacting stop means carried on the feed and tool heads adjustably limit the radial feed out of the tool head, and said clutch means permits slipping of said third gear upon engagement of said stop means.

12. A jig grinder head as defined in claim 9 wherein said feed head has a threaded stem surrounded in spaced relation by a cylindrical guide well, and a removable arbor of a selected size threaded onto said stem and having a guide base telescoped into said guide well.

13. A jig grinder head as defined in claim 9 wherein said coarse feed ring is calibrated relative to a reference mark on said feed head to provide a direct reading of both coarse and fine adjustments.

14. A jig grinder head as defined in claim 13 with means to provide an audible signal for at least each revolution of the feed head relative to the fine feed ring.

15. A jig grinder head as defined in claim 9 and having an adjustable gib on said tool head, and means for forcing said gib against the mating slide surface to eliminate all clearance and apply additional drag for additional rigidity during finish grinding and spark out.

References Cited
UNITED STATES PATENTS

| | | | |
|---|---|---|---|
| 2,093,743 | 9/1937 | Steiner | 279—6 |
| 2,559,180 | 7/1951 | Victory | 51—43 |
| 2,802,520 | 8/1957 | Nagle | 51—90 |
| 3,035,376 | 5/1962 | Szafran | 51—90 |
| 3,153,354 | 10/1964 | Prince | 51—245 X |

ROBERT C. RIORDON, Primary Examiner

D. G. KELLY, Assistant Examiner

U.S. Cl. X.R.

51—90, 241; 74—841; 77—58; 90—16; 279—6